United States Patent
Takatori et al.

(10) Patent No.: US 6,584,394 B2
(45) Date of Patent: Jun. 24, 2003

(54) SHIFT CONTROL SYSTEM OF AUTOMATIC TRANSMISSION

(75) Inventors: Kazuhiro Takatori, Fuji (JP); Osamu Sato, Fuji (JP); Yasushi Fujita, Fuji (JP); Tatsuya Imamura, Fuji (JP); Toshihide Fukasawa, Fuji (JP)

(73) Assignee: JATCO TransTechnology Ltd. (JP)

(*) Notice: Subject to any disclaimer, the term of this patent is extended or adjusted under 35 U.S.C. 154(b) by 0 days.

(21) Appl. No.: 10/040,273

(22) Filed: Jan. 4, 2002

(65) Prior Publication Data

US 2002/0116109 A1 Aug. 22, 2002

(30) Foreign Application Priority Data

Jan. 11, 2001 (JP) .................................. 2001-003456
Sep. 25, 2001 (JP) .................................. 2001-292214

(51) Int. Cl.$^7$ ............................................. F16H 61/02
(52) U.S. Cl. ............................ 701/55; 701/51; 701/52
(58) Field of Search ........................ 701/55, 51, 52, 701/78, 64, 95; 477/34

(56) References Cited

U.S. PATENT DOCUMENTS

| | | | |
|---|---|---|---|
| 4,354,236 A | * 10/1982 | Miki et al. | 477/154 |
| 4,553,259 A | * 11/1985 | Chainer et al. | 382/120 |
| 5,079,971 A | * 1/1992 | Yoshimura et al. | 477/161 |
| 5,081,887 A | * 1/1992 | Kato | 477/102 |
| 5,251,509 A | * 10/1993 | Pollack et al. | 475/127 |
| 5,393,275 A | * 2/1995 | Okada et al. | 477/81 |
| 5,662,551 A | * 9/1997 | Kamada | 477/152 |
| 5,779,594 A | * 7/1998 | Minowa et al. | 477/109 |
| 5,865,708 A | * 2/1999 | Nishio et al. | 477/154 |
| 6,101,440 A | * 8/2000 | Wagner et al. | 701/67 |
| 6,190,286 B1 | * 2/2001 | Ito et al. | 477/160 |

FOREIGN PATENT DOCUMENTS

EP  402863 A2 * 12/1990  ........... B06K/41/08

* cited by examiner

Primary Examiner—William A. Cuchlinski, Jr.
Assistant Examiner—Olga Hernandez
(74) Attorney, Agent, or Firm—Rossi & Associates (57) ABSTRACT

A standby phase target time is determined with reference to a table according to a read engine load and vehicle speed. A standby phase real time is then measured, and a learning correction value is calculated and stored. In a next shifting operation, a value that is found by adding the learning correction value to a hydraulic pressure command value in the previous shifting operation is used as a new hydraulic pressure command value. This learning correction is performed in small regions where the vehicle speed increases with the throttle opening being substantially constant. This accurately compensates a change in characteristics of a hydraulic system without being affected by a rapid change in torque or the like.

9 Claims, 7 Drawing Sheets

SHIFT CONTROL SYSTEM OF AUTOMATIC TRANSMISSION

BACKGROUND OF THE INVENTION

1. Field of the Invention

The present invention relates to a shift control system of an automatic transmission for vehicles.

2. Description of the Prior Art

An automatic transmission for vehicles achieves a plurality of gear positions providing respective predetermined gear ratios by engaging and disengaging engagement devices such as clutches and brakes combined with planetary gear mechanisms and actuated by hydraulic pressure.

To engage the engagement device, hydraulic pressure applied to the engagement device must be controlled in such a manner as to quickly complete a shifting operation while preventing a shift shock.

Accordingly, Japanese Laid-Open Patent Publication No. 2000-81125, for example, discloses a shift control system that proceeds a shifting operation while maintaining a command value of hydraulic pressure supplied to an engagement device at a constant shelf pressure at the initial stage of an inertia phase wherein the gear ratio represented by the ratio of input revolutions to output revolutions of a transmission changes from a before-shifting gear ratio toward an after-shifting gear ratio, and provides feedback control such that an actual gear ratio is equal to a target gear ratio at the later stage of the inertial phase.

Incidentally, an engagement device has driving and driven friction elements that are engaged or disengaged by hydraulic pressure. Even if the supply of hydraulic pressure to the engagement device starts in response to a shifting command, the engagement of the friction elements cannot be started immediately. The friction elements cannot actually start engaging with each other until a hydraulic pressure chamber of the engagement device is filled with working oil. It is therefore necessary to pass through a standby phase before the gear ratio starts changing.

Figure 8:
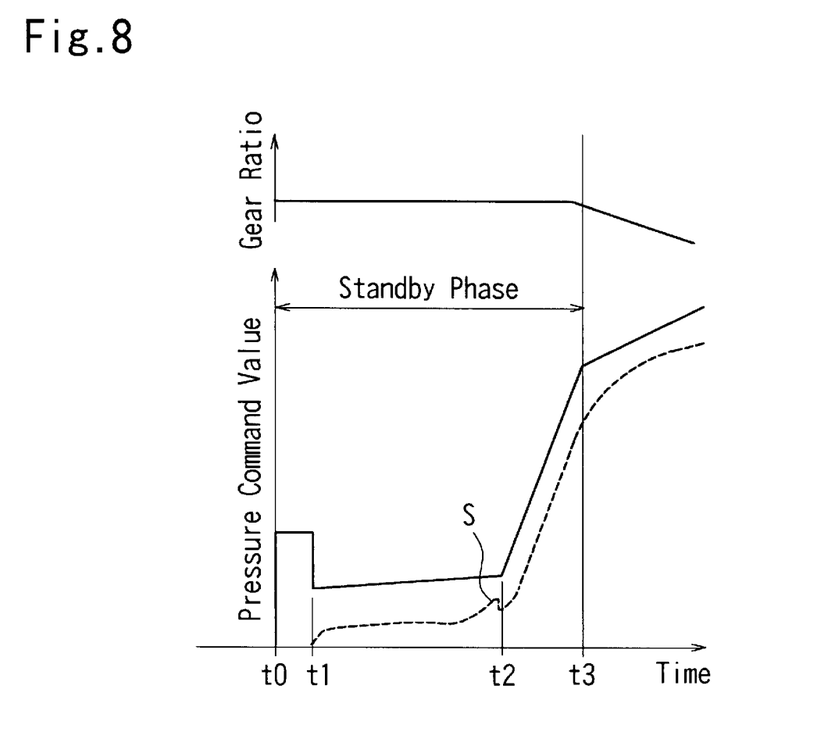
FIG. 8 is a diagram showing an example of a hydraulic pressure command value in a standby phase.

Usually, in the standby phase, a hydraulic pressure command value is increased once to a high level in response to a shifting command at a time t0, and is then maintained at a low level for a predetermined period of time after the time t1 as shown in FIG. 8. The hydraulic pressure command value is then increased at a predetermined inclination from the time t2 to a time t3 when the gear ratio starts changing. The above-mentioned inertia phase lies after from the time t3 downward.

The time t2 is supposed to be a point in time when the hydraulic pressure chamber is filled with hydraulic fluid, and a broken line indicates an actual value of hydraulic pressure.

Upon completion of filling in the hydraulic pressure chamber, a surge S occurs in the actual value of the hydraulic pressure applied to the hydraulic pressure chamber with respect to hydraulic pressure command value in the standby phase from the time t0 to t3.

Figure 9A:
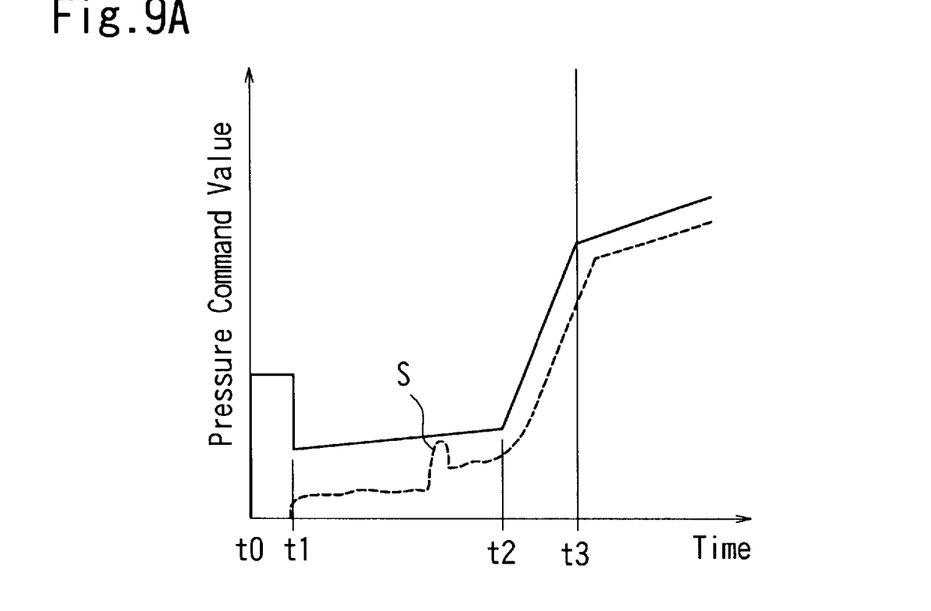
FIGS. 9A and 9B are diagrams useful in explaining conventional problems.

If the hydraulic pressure command value is too large in the standby phase, the actual filling is completed before the time t2 as shown in FIG. 9(a), and a shock occurs due to a great surge S resulting from a great difference between the hydraulic pressure command value and the hydraulic pressure actual value.

Figure 9B:
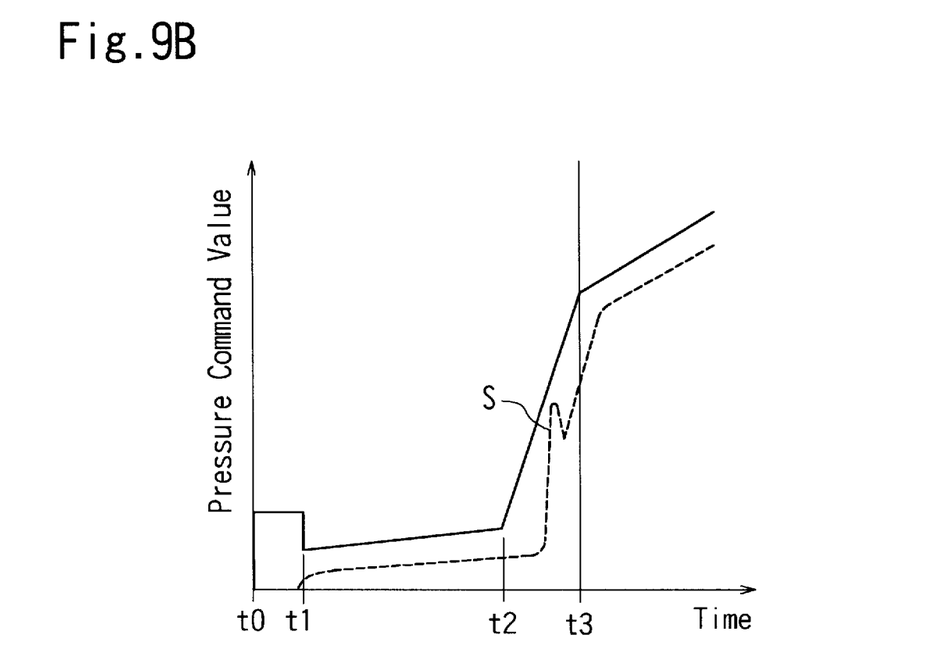

On the other hand, if the hydraulic pressure command value is too small in the standby phase, the filling is not actually completed when the hydraulic pressure should be increased toward an inertia phase starting point according to the hydraulic pressure command value as shown in FIG. 9(b), and this increases a period of time required for shifting.

A conventional shift control system, however, provides feedback control only in the inertia phase, and thus, a shock may occur or a shift time may be shifted in a shifting operation due to the above described phenomenon in the standby phase. This deteriorates the commercial value of the automatic transmission.

SUMMARY OF THE INVENTION

It is therefore an object of the present invention to provide a shift control system of an automatic transmission that is capable of properly controlling hydraulic pressure in a standby phase of an engagement device and quickly carrying out a shifting operation while preventing the occurrence of a shock.

To accomplish the above object, the present invention provides a hydraulic control system of an automatic transmission which outputs a hydraulic pressure command value increased to a high level, maintained at a low level for a predetermined period of time and then increased at a predetermined inclination until a gear ratio starts changing and engages an unengaged engagement device in response to a shifting command for shifting from a first gear ratio to a second gear ratio according to an operating state, the hydraulic control system comprising: standby phase target time setting means for setting a target time from an output of the shifting command until the gear ratio starts changing due to the supply of hydraulic pressure to the engagement device; standby phase real time measuring means for measuring a real time until the gear ratio starts changing due to the supply of hydraulic pressure to the engagement device after the output of the shifting command; correction value calculating means for calculating a correction hydraulic pressure value based upon a difference between the target time and the real time; and hydraulic pressure command value correcting means for correcting the hydraulic pressure command value by the correction hydraulic pressure value in a next shifting operation.

According to the present invention, the correction hydraulic pressure value is calculated based on a difference between the target time set by the standby phase target time setting means and the real time of the standby phase, and the command value of the hydraulic pressure applied to the engagement device is corrected by the correction hydraulic pressure in the next shifting operation. This compensates a change in characteristics of a hydraulic system for the engagement device, and prevents the occurrence of a surge shock and a shift delay.

In one preferred form of the present invention, the standby phase target time setting means sets a target time in each small region defined by an engine load and a vehicle speed, each small region where the vehicle speed increases while the engine load is substantially constant.

Since the standby phase target time setting means sets the target time when the operating state lies in a small region where the engine load is changing at a substantially constant rate and the vehicle speed is increasing, i.e. when the operating state is stable, there is no affection by a great change in revolutionary speed and a change in torque caused by a rapid change in operating state. This enables learning correction of a standby phase time by precisely detecting a change in characteristics of the hydraulic system and accurately correcting the hydraulic pressure command value.

In another preferred form of the present invention, the higher the vehicle speed is, the longer is the set target time.

By this, it is possible to correspond to the characteristics of the filling of hydraulic fluid pressure in the engagement device in a normal shifting operation. This surely prevents the occurrence of a surge shock and a shift delay.

In yet another preferred form of the present invention, the hydraulic control system further comprises: oil temperature detecting means for detecting an oil temperature; wherein the hydraulic pressure command value correcting means corrects a predetermined basic hydraulic pressure command value by the correction hydraulic pressure value; and the standby phase target time setting means sets the target time according to the oil temperature detected by the oil temperature detecting means.

With this feature, it is possible to control the shifting operation according to the effect of the viscosity, etc. resulting from the temperature of hydraulic fluid.

In yet another preferred form of the present invention, the lower the oil temperature is, the larger is the set basic hydraulic pressure command value. In yet another preferred form of the present invention, the lower the oil temperature is, the longer is the set target time. In yet another preferred form of the present invention, the lower the oil temperature is, the larger is the set correction hydraulic pressure value.

With the basic hydraulic pressure command value, the target time, or the correction hydraulic pressure value being determined to be larger, longer, or larger for a lower oil temperature, the delicate and accurate shifting operation can be achieved.

In yet another preferred form of the present invention, the next shifting operation includes a shifting operation outside the small region where the target time used for calculating the present correction hydraulic pressure value is set.

Since the correction hydraulic value is determined according to a change in characteristics of the respective components in the hydraulic system concerned with the engagement device, the hydraulic pressure command value can be corrected by directly using the correction hydraulic value for shifting in an operating state outside the small region that is used for calculating the correction hydraulic pressure value.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The present invention will now be described in detail with reference to the drawings showing embodiments thereof.

Figure 1:
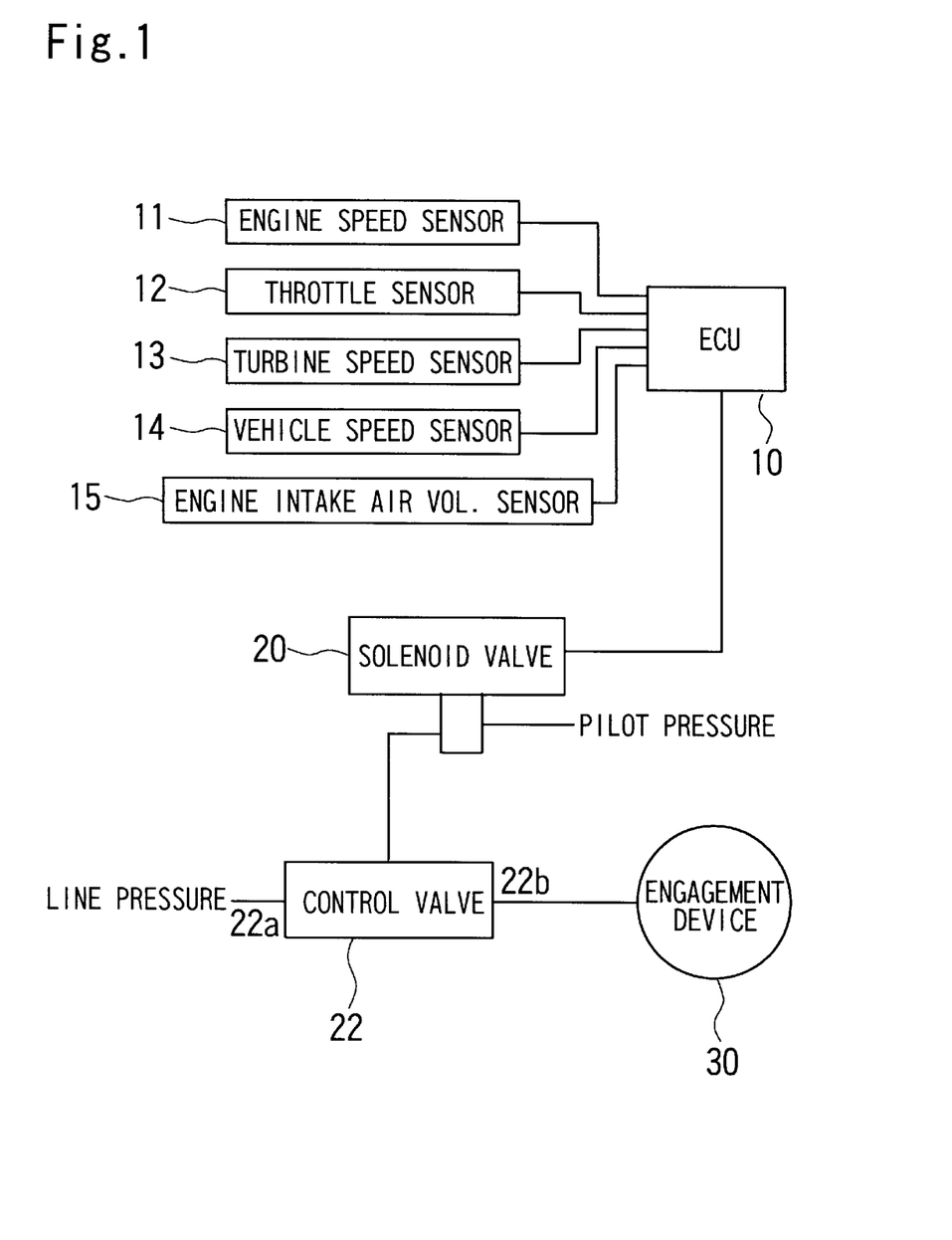
FIG. 1 is a diagram showing the circuit arrangement of a hydraulic control circuit according to the first embodiment of the present invention.

FIG. 1 is a diagram showing the arrangement of an oil control circuit to which is applied an engagement device according to the first embodiment of the present invention. This engagement device 30 is disengaged at the first gear position among a plurality of gear positions provided by an automatic transmission, and is engaged at the second gear position.

The automatic transmission is connected to an engine via a torque converter that is not illustrated. An electronic control unit (ECU) 10 receives signals from an engine speed sensor 11, a throttle sensor that detects the angle of a throttle valve opening of an engine, a turbine revolutionary speed sensor 13 that detects the turbine revolutionary speed of a torque converter, a vehicle speed sensor 14, and an engine intake air volume sensor 15.

The vehicle speed sensor 14 detects the revolutionary speed of an output shaft of the automatic transmission, and multiplies the detected revolutionary speed by a predetermined coefficient to find a vehicle speed. The ratio of the output shaft evolutionary speed to the turbine revolutionary speed corresponds to a gear ratio of the automatic transmission.

The engagement device 30 is provided with a hydraulic pressure chamber that is not illustrated, and hydraulic pressure obtained by regulating line pressure by a control valve 22 is supplied to the hydraulic pressure chamber. The control valve 22 is driven by hydraulic pressure that is acquired by controlling constant pilot pressure based on the line pressure by a solenoid valve 20.

The electronic control unit 10 outputs a control signal to the solenoid valve 20.

According to control hydraulic pressure supplied from the solenoid valve 20, the control valve 22 regulates the line pressure inputted to an input port 22a and outputs the regulated line pressure to the engagement device 30 from an output port 22b.

Likewise, the electronic control unit 10 outputs a control signal to other engagement devices that are not illustrated.

The electronic control unit 10 generates a hydraulic pressure command value therein, and outputs electric current corresponding to the hydraulic pressure command value as the above-mentioned control signal.

First, the electronic control unit 10 outputs a shifting command when an operating state exceeds a shift line that is preset based on the throttle valve opening and the vehicle speed.

Figure 2:
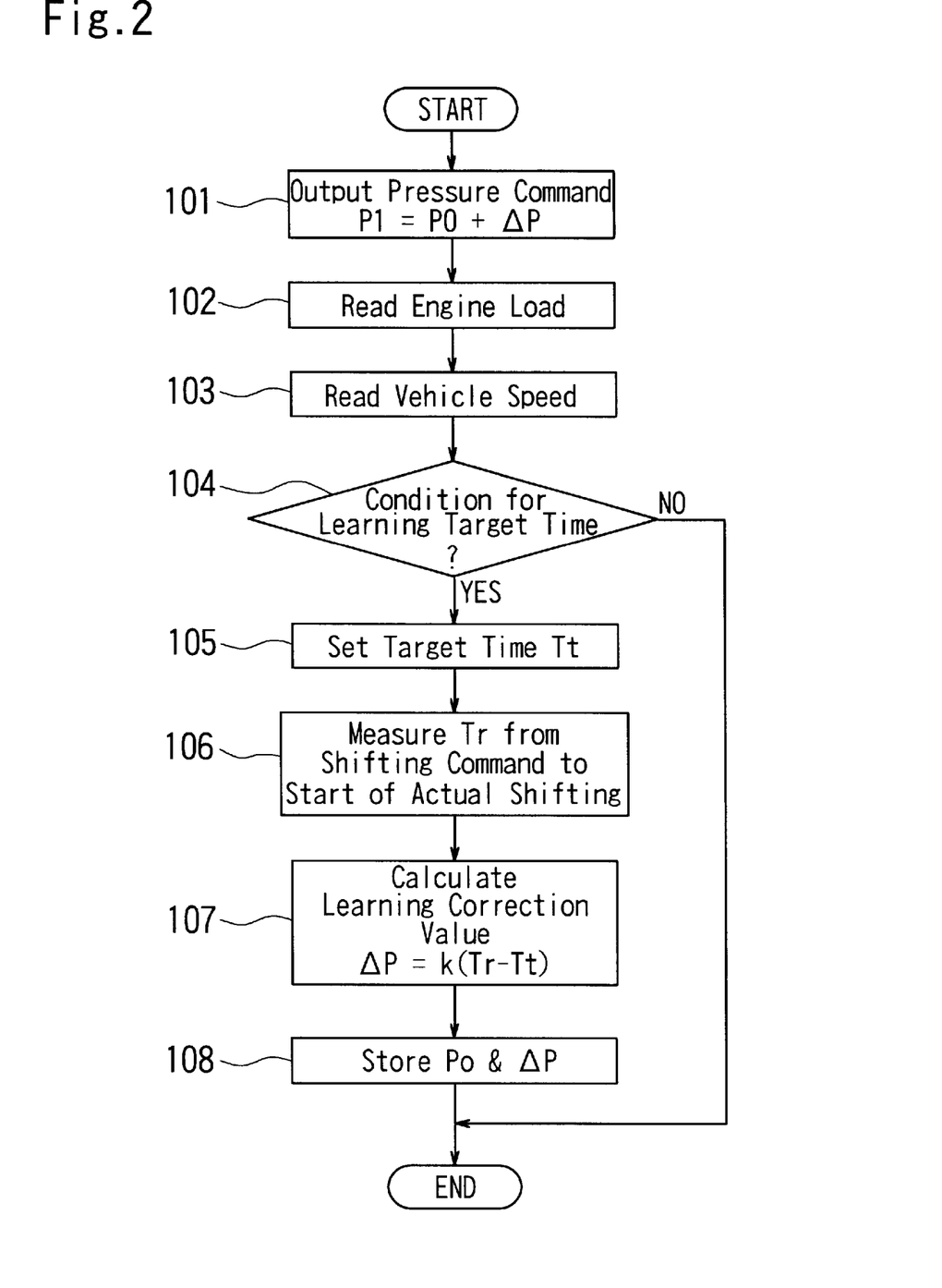
FIG. 2 is a flow chart showing the procedure for controlling hydraulic pressure.

FIG. 2 is a flow chart showing a hydraulic pressure controlling process carried out by the electronic control unit 10 in the upshift from the first gear position to the second gear position in response to a shifting command.

Figure 3:
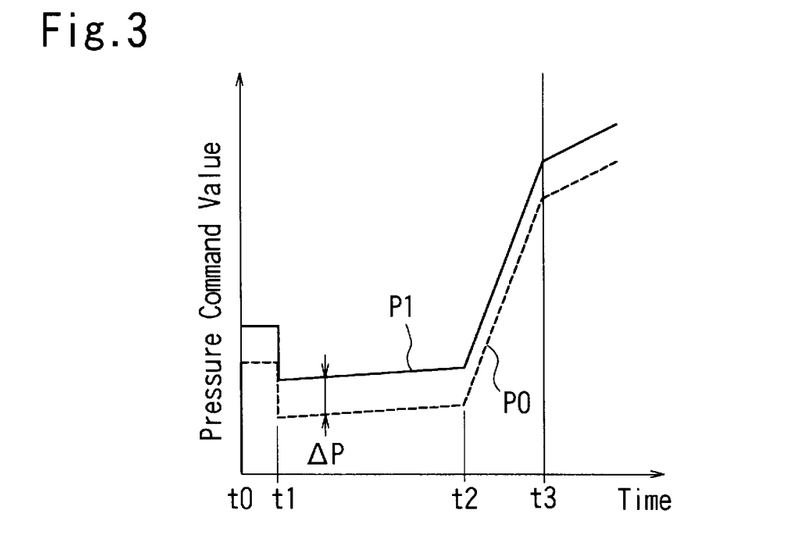
FIG. 3 is a diagram showing a change in hydraulic pressure command value.

First, in a step 101, the electronic control unit 10 starts outputting a hydraulic pressure command value P1 as shown in FIG. 3 according to the shifting command in order to control hydraulic fluid pressure applied to the engagement device 30.

The hydraulic pressure command value P1 is found by adding a later-described previous learning correction value $\Delta P$ to a hydraulic pressure command value P0 used in the previous shifting from the first gear position to the second gear position as represented by the following expression:

$$P1 = P0 + \Delta P$$

Similarly to the example shown in FIG. 8, in a standby phase, the hydraulic pressure command value P1 is increased to a high level upon receipt of a shifting command at a time t0, is maintained at a low level for a predetermined period of time after a time t1, and is increased at a predetermined inclination from a time t2 to a time t3 when the gear ratio starts changing.

At the same time, the electronic control unit 10 reads an engine load signal in a step 102 and reads a vehicle speed signal in a step 103.

For example, an input value of the throttle sensor 12, or an engine output shaft torque value that is calculated based on the engine speed and the engine intake air volume is used as the engine load signal.

In a step 104, whether the vehicle is in a operating condition for learning the target time or not is determined with reference to a preset table for use in calculating a learning target time.

Figure 4:
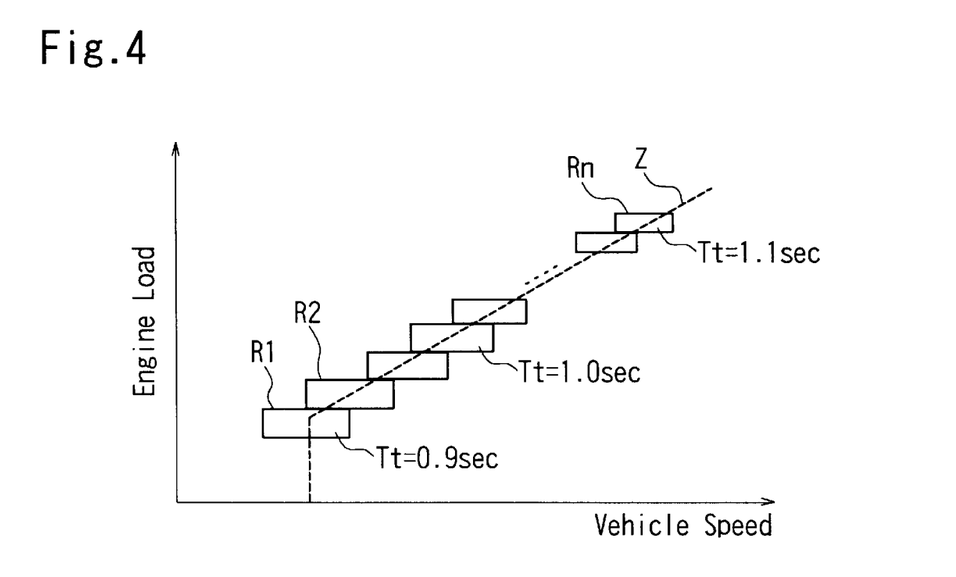
FIG. 4 is a table for use in calculating a learning target time.

FIG. 4 shows the table for use in calculating the learning target time, and the table has a number of small regions R (R1, R2, . . . , Rn) determined by the engine load and the vehicle speed. These small regions R are arranged adjacently to one another on a first to second gear shift line Z determined by the throttle valve angle and the vehicle speed.

Each small region R sets (specifies) an operating condition in which the target time should be learned, and also sets a target time Tt. The target time Tt is as short as, e.g. 0.9 second at the minimum end of the engine load and the vehicle speed, and is as long as, e.g. 1.1 second at the maximum end of the engine load and the vehicle speed. This aims at corresponding to the characteristics of a shift time in a normal shifting operation because a larger vehicle speed requires a longer period of time for filling the engagement device 30 with hydraulic fluid pressure.

Each small region R has a small range of the engine load, and a relatively large range of the vehicle speed. In other words, the shift time is learned while the vehicle speed is increased for upshift with a depression angle of an accelerator pedal, not shown, being substantially constant.

If the present operating condition lies in any one small range R, it is determined that the target time is being learned, and the program proceeds to a step 105.

In the step 105, a time set in the small region R of the table is regarded as the target time Tt, and a learning control process is then started.

First, in a step 106, a time Tr from the time t0 in FIG. 3 when the shifting command is outputted to a point in time when the actual shifting operation is started, i.e. the time t3 when the gear ratio starts changing is measured.

More specifically, the time t3 is found as a point in time when the turbine revolutionary speed is lowered to a predetermined value set to a slightly lower point than a value at the first gear position.

In a step 107, the learning correction value ΔP for the hydraulic pressure command value is calculated according to the following equation:

$$\Delta P = k(Tr - Tt)$$

where k is a constant.

In the next step 108, the present hydraulic pressure command value P1 is stored as P0 with the learning correction value ΔP in an internal memory.

These values P0 and ΔP are used as a new hydraulic pressure command value P1 in the step 101 in the next shifting from the first gear position to the second gear position.

If it is determined in the previous step 104 that the present operating condition does not lie in any small region R, it is determined that the learning of the target time is not executed, and the controlling process is terminated.

It should be noted that the learning correction value is found in the shifting from the first gear position to the second gear position in the small region R as described above, but the found learning correction value can be applied not only to the next shifting from the first gear position to the second shift potion in the corresponding small region R but also to another shifting wherein the unengaged engagement device 30 is brought into an engaged state even at the outside of the small region R.

According to the present embodiment, the steps 102 to 105 in the above described procedure constitute a standby phase target time setting means of the invention, the step 106 constitutes a standby phase real time measuring means, the step 107 constitutes a correction value calculating means, and the step 101 constitutes a hydraulic pressure command value correcting means.

According to the present embodiment that is constructed in the above described manner, the time Tr in the standby phase from the output of the shifting command to the start of the actual shifting operation is learned in every shifting operation, and the hydraulic pressure command value for the engagement device 30 is corrected in a next shift according to a difference between the time Tr and the target time Tt determined according to the operating condition. This compensates a change in characteristics of a hydraulic system such as the control valve 22 and the solenoid valve 20 concerned with the engagement device 30, and prevents the occurrence of a surge shock and a shift delay.

Further, the target time is learned in the small region R where the vehicle speed is increased for upshift with the depression angle of the accelerator pedal being substantially constant. It is therefore possible to precisely learn the target time without being affected by a change in revolutionary speed of various revolving elements and a change in torque occurring when the throttle valve opening is rapidly changed by the depression of the accelerator pedal.

Since the learning reflects a change in characteristics of the hydraulic system, the learned value can be used not only in the operating condition lying in a specific small region R where the target time is learned but also in other operating condition such as a shifting operation carried out by depression of the accelerator pedal or the like.

A description will now be given of the second embodiment. According to the present embodiment, the oil temperature of the transmission is divided into a plurality of ranges, and the oil temperature ranges are added as control parameters so that the hydraulic pressure can be learned in each oil temperature range.

Figure 5:
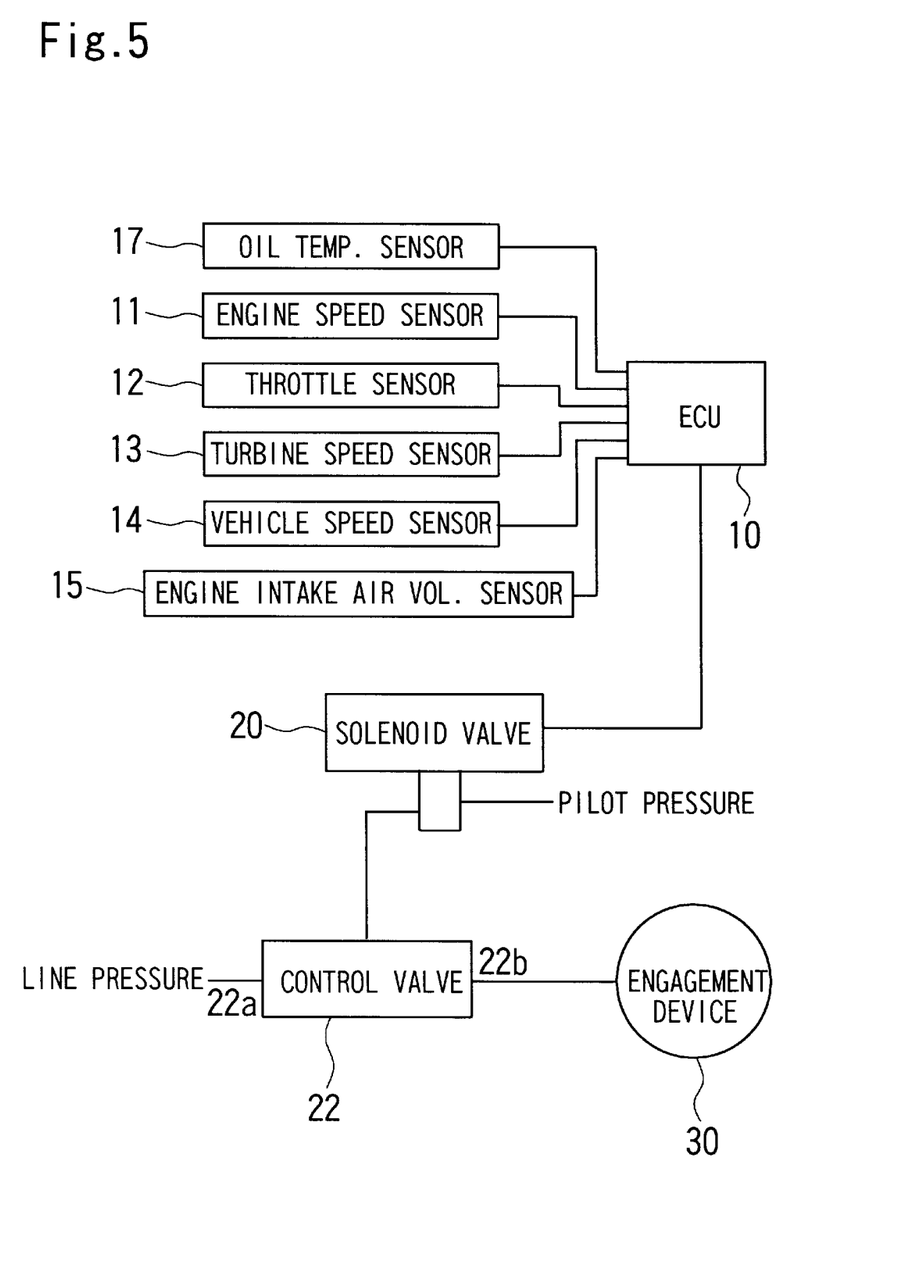
FIG. 5 is a diagram showing the circuit arrangement of a hydraulic control circuit according to the second embodiment of the present invention.

FIG. 5 shows the arrangement of a hydraulic pressure control circuit according to the second embodiment. The arrangement of the second embodiment is identical with that of the first embodiment described with reference to FIG. 1 except that a transmission oil temperature sensor 17 is additionally connected to the electronic control unit (ECU) 10.

As is the case with the first embodiment, the electronic control unit 10 outputs a shifting command when the operating condition crosses a shift line that is preset based on the throttle valve opening and the vehicle speed.

Figure 6:
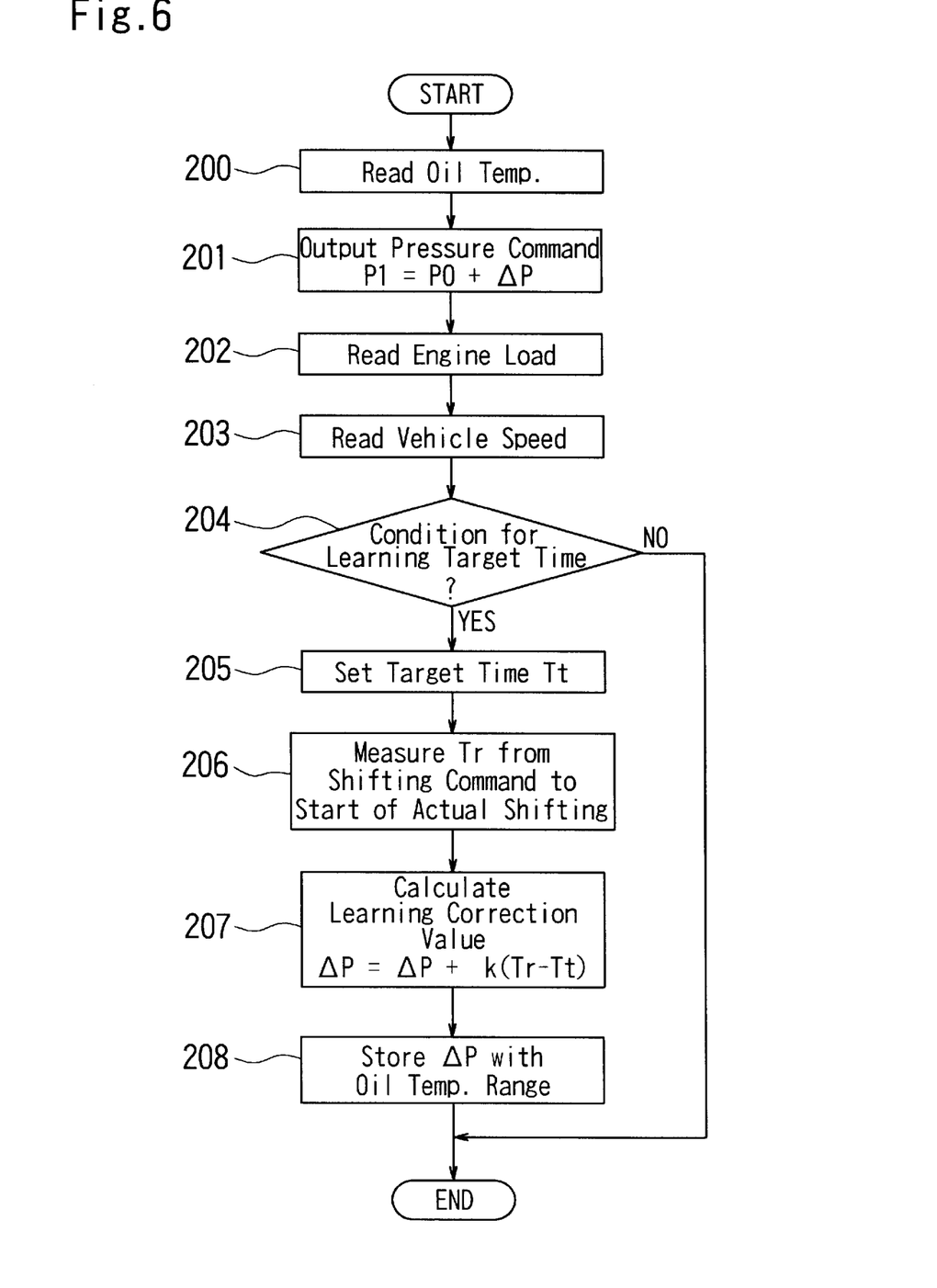
FIG. 6 is a flow chart showing the procedure for controlling hydraulic pressure.

FIG. 6 is a flow chart showing a hydraulic controlling process carried out by the electronic control unit 10 when the transmission is shifted from the first gear position to the second gear position in response to a shifting command.

First, in a step 200, the electronic control unit 10 reads the oil temperature detected by the transmission oil temperature sensor 17.

Figure 7:
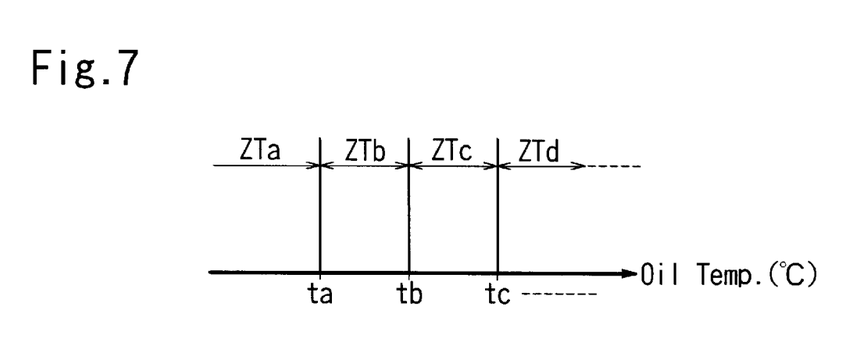
FIG. 7 is a diagram showing oil temperature ranges.

As shown in FIG. 7, the oil temperature is divided into a plurality of oil temperature ranges ZT at predetermined intervals.

Specifically, the oil temperature equal to or lower than ta is classified into a range Zta, the oil temperature between ta and tb is classified into a range ZTb, the oil temperature between tb and td is classified into a range ZTc, and so on.

In the next step 201, the electronic control unit 10 starts outputting a hydraulic pressure command value P1 according to a shifting command in order to control hydraulic fluid pressure applied to the engagement device 30.

The hydraulic pressure command value P1 is found by adding a later-described previous learning correction value ΔP to a basic hydraulic pressure command value PA stored in an internal memory of the electronic control unit 10 as represented by the following expression:

$$P1=PA+\Delta P$$

It should be noted that the learning correction values ΔP are stored together with the oil temperature ranges ZT as described later, and a previous learning correction value ΔP in the oil temperature range ZT, to which the oil temperature read in the step 200 belongs, is used.

The basic hydraulic pressure command values PA are also set for the respective oil temperature ranges ZT, and the lower the oil temperature is, the higher is a low-level basic hydraulic pressure command value PA having increased once to a high level in a standby phase.

In the standby phase, the hydraulic pressure command value P1 is increased to a high level upon receipt of a shifting command at a time t0, is maintained at a low level for a predetermined period of time after a time t1, and is increased at a predetermined inclination from a time t2 to a time t3 when the gear ratio starts changing.

The electronic control unit 10 reads an engine load signal in a step 202 and reads a vehicle speed signal in a step 203.

These steps 202 and 203 are identical with the steps 102 and 103 in FIG. 2 showing the first embodiment.

In a step 204, whether the vehicle is in a operating condition for learning the target time or not is determined with reference to a preset table for use in calculating a learning target time, not shown.

Similarly to the one in FIG. 4, the table for use in calculating the learning target time has a number of small regions R (R1, R2, . . . , Rn) that are determined by the engine load and the vehicle speed and arranged in a shift line from the first gear position to the second gear position, and additionally, the target time Tt in each small region R is set for each oil temperature range ZT.

If the present operating condition lies in any one small region R, it is determined that the target time is being learned, and the program proceeds to a step 205.

In the step 205, a time set in the small region R of the table is regarded as the target time Tt, and a learning control process is started.

First, in a step 206, a real time Tr from the output of a shifting command to a time when the gear ratio starts changing is measured. This step 206 is identical with the step 106 in FIG. 2 showing the first embodiment.

In a step 207, the learning correction value ΔP for the hydraulic pressure command value is calculated and updated according to the following equation:

$$\Delta P=\Delta P+k(Tr-Tt)$$

where k is a constant.

In the next step 208, the learning correction values ΔP as well as the oil temperature ranges ZT are stored in the internal memory.

The learning correction values ΔP and the oil temperature ranges ZT are used in calculating the hydraulic pressure command value P1 in the step 201 in the next shifting from the first gear position to the second gear position.

If it is determined in the previous step 204 that the present operating condition does not lie in any small region R, it is determined that the target time is not being learned, and the controlling process is terminated.

It should be noted that the learning correction value is found in the shifting from the first gear position to the second gear position in the small region R as described above, but the found learning correction value can be applied not only to the next shifting from the first gear position to the second shift potion in the corresponding small region R but also to another shifting wherein the unengaged engagement device 30 is brought into an engaged state even at the outside of the small region R.

According to the present embodiment, the step 200 in the above described procedure constitutes an oil temperature detecting means of the invention, the steps 202 to 205 constitute a standby phase target time setting means, the step 206 constitutes a standby phase real time measuring means, the step 207 constitutes a correction value calculating means, and the step 201 constitutes a hydraulic pressure command value correcting means.

According to the present embodiment that is constructed in the above described manner, the time Tr of the standby phase from the output of the shifting command to the start of the actual shifting operation is learned in every shifting operation, and the hydraulic pressure command value for the engagement device 30 is corrected in the next shifting operation according to a difference between the time Tr and the target time Tt determined according to the oil temperature and the operating condition.

As is the case with the first embodiment, this compensates a change in characteristics of a hydraulic system such as the control valve 22 and the solenoid valve 20 concerned with the engagement device 30, and prevents the occurrence of a surge shock and a shift delay. Further, the basic hydraulic pressure command value PA, the target time Tt and the learning correction value ΔP are determined correspondingly to the oil temperature, and this enables the quick convergence of learning without increasing a difference between the hydraulic pressure command value and the actual value even if the hydraulic pressure filling time is changed due to the increase in the viscosity of working oil resulting from the change in oil temperature and the increase in resistance of a sliding portion of the engagement device. It is therefore possible to set the hydraulic pressure command value presupposing that a period of time for filling the engagement device with hydraulic pressure is shorter, e.g. at a normal temperature than at a low temperature, and this reduces the shift time and reduces the shift shock.

Although in the present embodiment, the constant k is fixed in the calculation of the ΔP=k(Tr−Tt) in the step 207, the constant k may be varied according to the oil temperature ranges.

Although the above described embodiments are based on the upshift from the first gear position to the second gear position, this is not limitative, but the present invention may be applied to any gear positions insofar as the engagement device can be disengaged before the shifting and engaged after the shifting.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A hydraulic control system of an automatic transmission, which outputs a hydraulic pressure command value increased to a high level, maintained at a low level for a predetermined period of time and then increased at a predetermined inclination until a gear ratio starts changing, and engages an unengaged engagement device in response to a shifting command for shifting from a first gear ratio to a second gear ratio according to an operating condition, said hydraulic control system comprising:

standby phase target time setting means for setting a target time from an output of the shifting command until the gear starts changing due to the supply of hydraulic pressure to the engagement device;

standby phase real time measuring means for measuring a real time until the gear ratio starts changing due to the supply of hydraulic pressure to the engagement device after the output of the shifting command;

correction value calculating means for calculating a correction hydraulic pressure value based upon a difference between the target time and the real time; and hydraulic pressure command value correcting means for correcting the hydraulic pressure command value by the correction hydraulic pressure value in a next shifting operation, wherein said standby phase target time setting means sets a target time in each small region specified by an engine load arid a vehicle speed, the each small region where the vehicle speed increases with the engine load being substantially constant.

2. A hydraulic control system of an automatic transmission according to claim 1, wherein the higher the vehicle speed is, the longer is the set target time.

3. A hydraulic control system of an automatic transmission according to claim 1, further comprising:

oil temperature detecting means for detecting an oil temperature;

wherein said hydraulic pressure command value correcting means corrects a predetermined basic hydraulic pressure command value by the correction hydraulic pressure value; and wherein said standby phase target time setting means sets the target time according to the oil temperature detected by said oil temperature detecting means.

4. A hydraulic control system of an automatic transmission according to claim 3, wherein the lower the oil temperature is, the larger is the set basic hydraulic pressure command value.

5. A hydraulic control system of an automatic transmission according to claim 3, wherein the lower the oil temperature is, the longer is the set target time.

6. A hydraulic control system of an automatic transmission according to any one of claim 3, wherein the lower the oil temperature is, the larger is the set correction hydraulic pressure value.

7. A hydraulic control system of an automatic transmission according to claim 1, wherein the next shifting operation includes a shifting operation, outside the small region where the target time used for calculating the correction hydraulic pressure value is set.

8. A hydraulic control system of an automatic transmission, which outputs a hydraulic pressure command value increased to a high level, maintained at a low level for a predetermined period of time and then increased at a predetermined inclination until a gear ratio starts changing, and engages an unengaged engagement device in response to a shifting command for shifting from a first gear ratio to a second gear ratio according to an operating condition, said hydraulic control system comprising:

standby phase target time setting means for setting a target time from an output of the shifting command until the gear starts changing due to the supply of hydraulic pressure to the engagement device;

standby phase real time measuring means for measuring a real time until the gear ratio starts changing due to the supply of hydraulic pressure to the engagement device after the output of the shifting command;

correction value calculating means for calculating a correction hydraulic pressure value based upon a difference between the target time and the real time; and hydraulic pressure command value correcting means for correcting the hydraulic pressure command value by the correction hydraulic pressure value in a next shifting operation, wherein the higher the vehicle speed is, the longer is the set target time.

9. A hydraulic control system of an automatic transmission, which outputs a hydraulic pressure command value increased to a high level, maintained at a low level for a predetermined period of time and then increased at a predetermined inclination until a gear ratio starts changing, and engages an unengaged engagement device in response to a shifting command for shifting from a first gear ratio to a second gear ratio according to an operating condition, said hydraulic control system comprising:

standby phase target time setting means for setting a target time from an output of the shifting command until the gear starts changing due to the supply of hydraulic pressure to the engagement device;

standby phase real time measuring means for measuring a real time until the gear ratio starts changing due to the supply of hydraulic pressure to the engagement device after the output of the shifting command;

correction value calculating means for calculating a correction hydraulic pressure value based upon a difference between the target time and the real time;

hydraulic pressure command value correcting means for correcting the hydraulic pressure command value by the correction hydraulic pressure value in a next shifting operation; and oil, temperature detecting means for detecting an oil temperature, wherein said hydraulic pressure command value correcting means corrects a k predetermined basic hydraulic pressure command value by the correction hydraulic pressure value, and wherein said standby phase target time setting means sets the target time according to the oil temperature detected by said oil temperature detecting means.

* * * * *